United States Patent
Fujigaya

[11] Patent Number: 5,497,058
[45] Date of Patent: Mar. 5, 1996

[54] HEADLAMP CLEANING DEVICE CAPABLE OF ATTAINING A CONSTANT CLEANING CAPACITY

[75] Inventor: Taketoshi Fujigaya, Shizuoka, Japan

[73] Assignee: Koito Manufacturing Co., Ltd., Tokyo, Japan

[21] Appl. No.: 365,365

[22] Filed: Dec. 28, 1994

[30] Foreign Application Priority Data

Dec. 28, 1993 [JP] Japan .................. 5-074369 U

[51] Int. Cl.⁶ .................................. B60S 1/00
[52] U.S. Cl. .................. 318/446; 318/443; 318/479; 318/DIG. 2; 307/10.1; 307/130; 239/284.2; 15/250.002
[58] Field of Search .................. 318/443, 444, 318/445, 446, 478, 479, DIG. 2; 307/9.1, 10.1, 103, 116, 125, 126, 130; 239/284.1, 284.2; 15/250.001, 250.002

[56] References Cited

U.S. PATENT DOCUMENTS

| | | | |
|---|---|---|---|
| 4,282,445 | 8/1981 | Ditzer | 307/141 |
| 4,768,716 | 9/1988 | Buchanan, Jr. et al. | 239/284.1 |
| 4,851,745 | 7/1989 | Ponziani | 318/443 |
| 5,012,977 | 5/1991 | Karklins et al. | 239/284.1 |
| 5,073,722 | 12/1991 | Tohge et al. | 307/10.1 |

*Primary Examiner*—Bentsu Ro
*Attorney, Agent, or Firm*—Sughrue, Mion, Zinn, Macpeak & Seas

[57] ABSTRACT

It is an object of the present invention to offer a headlamp cleaning device which is always capable of attaining a constant cleaning capacity by keeping the ejected quantity of the cleaning fluid constant for a single cleaning operation without any regard to the fluctuations in the voltage of the electric power in the power source.

The headlamp cleaning device according to the present invention is provided with an electric power source voltage monitoring means which monitors the power source voltage as applied to a cleaning device motor. This device furnishes the power source voltage to the electric power supply time setting means. When a cleaning device switch 9 is turned ON, the electric power supply time setting means 10-2 sets the driving time T to a longer time period when the value of the electric power source voltage is low, but sets the driving time T to a shorter period when the value of the electric power source voltage is high. Additionally, the electric power supply time setting means supplies electric power from the electric power source to the cleaning device motor 7 just for the driving time T thus set. This operation puts the pump into operation, thereby ejecting the cleaning water stored in the tank through the nozzle.

7 Claims, 3 Drawing Sheets

5,497,058

HEADLAMP CLEANING DEVICE CAPABLE OF ATTAINING A CONSTANT CLEANING CAPACITY

BACKGROUND OF THE INVENTION

1. Field of the Invention

The present invention relates to a headlamp cleaning device which ejects cleaning fluid stored in a tank onto a headlamp through a nozzle.

2. Related Background Art

Conventional headlamp cleaning devices eject cleaning fluid onto a headlamp through a nozzle only for the time period during which the driver continues to push a switch. This conventional headlamp cleaning device would possibly consume a wasteful quantity of the cleaning fluid since the quantity of the cleaning fluid is determined by the driver's manual operations of the switch.

There is another type of conventional headlamp cleaning device which ejects cleaning fluid stored in a tank onto a headlamp through a nozzle by driving a motor for a predetermined time period when the driver pushes a switch for the motor. When the headlamp cleaning device of this type is operated, the cleaning liquid will be ejected for a predetermined time period, so that the quantity of the cleaning liquid is thereby constantly determined. As a result, the headlamp cleaning device does not consume any excessive quantity of the cleaning fluid or electric power.

Generally, however, when the value of the power source voltage supplied to the motor is decreased due to turning on an air conditioning apparatus and/or headlamp which requires relatively large voltage, or deterioration of the power source itself, the rotational speed of the motor also decreases and the revolutional number of the pump decreases thereby, both which cause the rotational power of the motor to become weaker. For this reason, the conventional headlamp cleaning device suffers from a problem in that the quantity of the cleaning fluid ejected for every single operation will be decreased to thereby decline the motor's cleaning ability because the motor is driven for a predetermined constant time period at one operation according to the conventional headlamp cleaning device.

On the other hand, in order to improve the cleaning capacity of the conventional headlamp cleaning device operated at a lower voltage, the driving time for the motor for one cleaning operation may be set at a longer time period. However, the headlamp cleaning device ejects excessive amount of cleaning fluid when the voltage is at a higher level, thereby consuming wasteful quantities of the cleaning fluid and the operating electric power.

SUMMARY OF THE INVENTION

The present invention was made with a view to overcoming these problems accompanying the conventional headlamp cleaning devices. Therefore, it is an object of the present invention to provide a headlamp cleaning device which can attain a constant cleaning capability by ejecting a predetermined constant quantity of cleaning fluid for any single cleaning operation without any regard to the changes in voltage of the electric power source.

In order to achieve the above object, the present invention provides a headlamp cleaning device operated with a motor driven for a predetermined period of time, in which the headlamp cleaning device includes: an electric power source voltage monitoring member, which monitors the electric power source voltage applied to the motor mentioned above, and a motor driving time setting member, which sets a longer driving period for the motor defined above according as the value of the electric power source voltage decreases, but sets a shorter driving period for the motor defined above according as the value of the electric power source voltage increases, in accordance with the value of the electric power source voltage being monitored by the electric power source voltage monitoring member defined above.

Accordingly, the present invention offers a headlamp cleaning device in which the motor driving period for every single cleaning operation will be set for a longer time period as the power source voltage declines, and for a shorter period as the electric power source voltage increases.

DETAILED DESCRIPTION OF THE PREFERRED EMBODIMENT

The present invention will be described in detail on the basis of aspects of its preferred embodiment.

1st Embodiment

Figure 1:
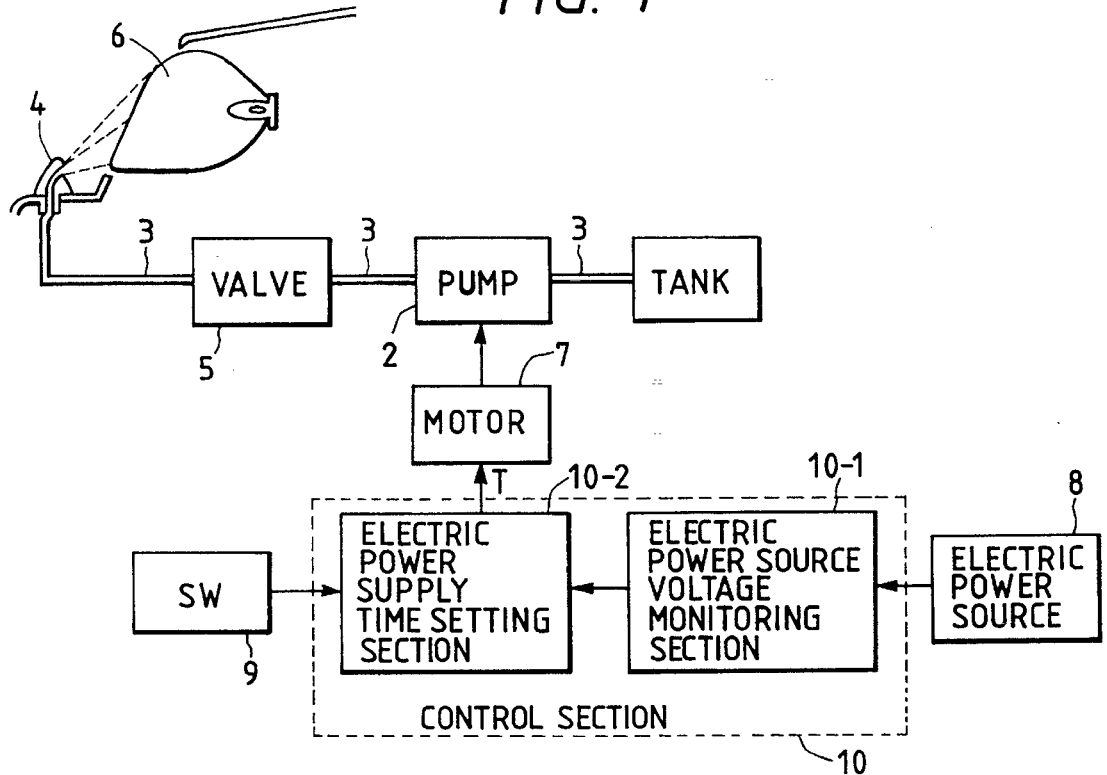
FIG. 1 is a block diagram illustrating a headlamp cleaning device described in an aspect of the preferred embodiment of the present invention.

FIG. 1 is a block diagram illustrating a headlamp cleaning device in an aspect of the preferred embodiment of the present invention. As shown in FIG. 1, the headlamp cleaning device for ejecting cleaning fluid onto a headlamp 6 according to the first embodiment of the invention is provided with a tank 1 for storing cleaning fluid, a pump 2, an connection pipe 3, a nozzle 4, a valve 5 disposed in the connection pipe 3, a motor 7 for driving the pump 2 (the motor being hereinafter referred to as "the cleaning device motor"), a power source 8, a manually operable automatic return type switch 9 (which will be hereinafter referred to as "the cleaning device switch"), and a control section 10.

The control section 10 is provided with an electric power voltage monitoring section 10-1 for monitoring the power source voltage (i.e., the value of the voltage of the power source 8) applied to the cleaning device motor 7, and an electric power supply time setting section 10-2 which varies the electric power supply time (i.e., the driving time) T to set a longer time period as the value of the electric power source voltage decreases and set a shorter time period as the value of the electric power source voltage increases. Thus the control section monitors the power source voltage value with the electric power source voltage monitoring section 10-1, and in response to an ON operation on the cleaning device switch 9, supplies the cleaning device motor 7 with electric power source voltage for the driving time T thus set.

When the cleaning device switch 9 is turned ON with this headlamp cleaning device, the electric power supply time setting section 10-2 is actuated. The electric power supply time setting section 10-2 determines the driving time T at a longer time period when the value of the electric power source voltage is low and sets the driving time T at a shorter time period when the value of the electric power source voltage is high. The value of the electric power source voltage is monitored by the electric power source voltage monitoring section 10-1. The monitoring section 10-1 furnishes the voltage value applied to the electric power supply time setting section 10-2, and the electric power supply time setting section 10-2 supplies the electric power source voltage to the cleaning device motor 7 for the driving time T thus determined.

The cleaning device motor 7 is driven for the driving time T set in the manner as described above and drives the pump 2. The pump 2 is driven for the driving time T, and the cleaning fluid stored in the tank 1 flows through the pipe 3 and ejects out of the nozzle 4.

Therefore, according to the first embodiment, the headlamp cleaning device can maintain a constant cleaning capability at all times by keeping the quantity of the cleaning fluid ejected for each cleaning operation at a constant level, without any regard to the value of the electric power source voltage. This is accomplished by the electric power supply time setting section 10-2 which appropriately sets the driving time T in accordance with the value of the electric power source voltage. The control section 10 can be realized in the present embodiment by employing a micro computer.

Second embodiment

Figure 2:
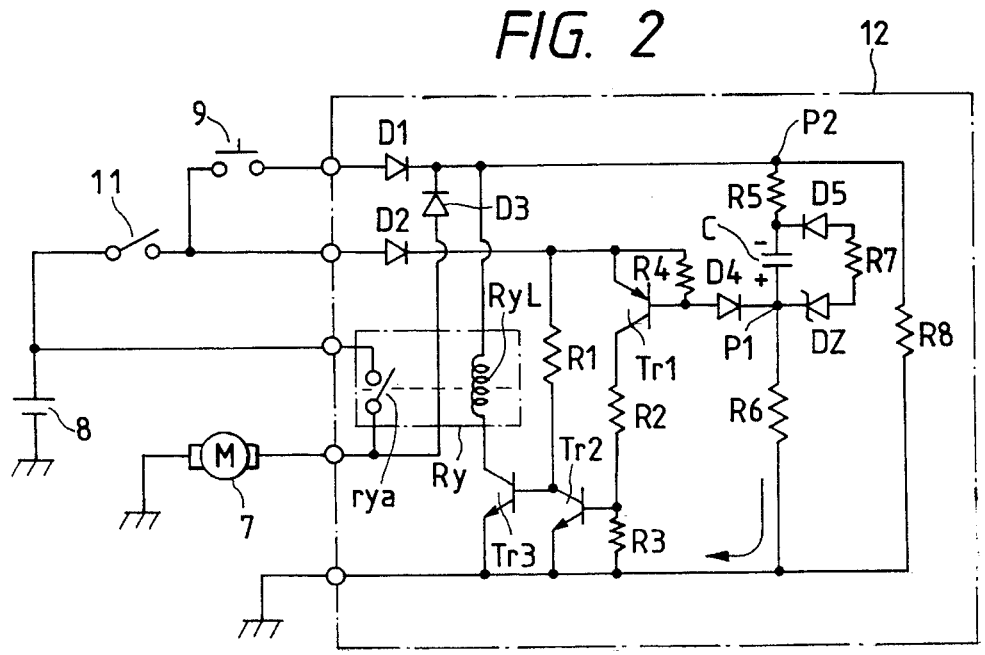
FIG. 2 is a diagram illustrating a circuit construction described in another aspect of the preferred embodiment of the present invention.

FIG. 2 is a circuit diagram showing a circuit arrangement of a second embodiment of the present invention. In FIG. 2, those component elements which are also used in the first embodiment by the same reference numbers, and therefore their description is omitted here. In the second embodiment, the same functions as those performed in the first embodiment are realized by hardware circuits. As shown in FIG. 2, the headlamp cleaning device includes an ignition switch 11, and a control circuit 12. The control circuit 12 is construed with diodes D1 to D5, transistors Tr1 to Tr3, a relay Ry, a Zener diode DZ, a capacitor C, and resistors R1 to R8. A serial circuit consisting of the Zener diode DZ, the resistor R7 and the diode D5 is connected in parallel with the capacitor C.

When the ignition switch 11 is turned ON while the cleaning device switch 9 is in OFF state in the headlamp cleaning device, an electric current flows from a power source 8 to the ground via the diode D2, resistor R4, diode D4, and resistor R6. In this condition, a base of the transistor Tr1 is in a low level L, so that the transistors Tr1 and Tr2 are in ON state whereas the transistor Tr3 is in OFF state and, accordingly, the relay Ry is not actuated. Therefore, the normally open contact rya of the relay Ry maintains its OFF-state, and no electric power is supplied to the cleaning device motor 7. In this state, incidentally, the electric current passing through the diode D4 also flows through the capacitor C and resistors R5 and R8. As the result of this condition, the capacitor C is charged with the cathode side of the diode D4 kept in the positive polarity.

In this case, the potential voltage $V_{P1}$ at a connecting point P1 between the capacitor C and the diode D4 is expressed by $V_{cc}-2.1$ V where the electric power source voltage is depicted by $V_{cc}$. On the other hand, when the charged voltage of the capacitor C is expressed by $C_v$, the value of $C_v$ is determined by the Zener diode $D_z$, resistor R7, and diode D5. By a selection of the resistance value for the resistor R7, the charged voltage $C_v$ of the capacitor C can be adjusted to be at a point between ($V_z$ (Zener voltage)+0.7) V (when R7=0 Ω) and ($V_{cc}-2.1$) V (when R7=∞). For example, if $V_z$ is selected to 6 V, the value of $C_v$ can be adjusted in the range of 6.7 V<$C_v$ <9.9 V, provided that $V_{cc}$=12 V. By the effect of this, the variation in the time for supplying electric power to the cleaning device motor 7 in relation to the variation of the electric power source voltage will be in the maximum when R7=0 Ω, as described later. Thus, it is accordingly possible to determine an optimum power supply time period by setting R7 to an appropriate value other than 0 Ω.

As mentioned above, when the cleaning device switch 9 is turned ON while the device is in a stand-by state in which the electric potentials in the individual parts of the circuitry are set by turning on the ignition switch 11, a voltage will be applied from the power source 8 to a point P2 connecting between the resistor R5 and the resistor R8 through the diode D1, and the potential at the connecting point P2 rises up sharply to ($V_{cc}-0.7$) V. As the result of this operation, the electric potential $V_{P1}$ at the point P1 also rises sharply from ($V_{cc}-2.1$) V to the level of ($V_{cc}-0.7-C_v$) V, which is equivalent to the electric potential at the point P2 plus the charged voltage of the capacitor C. In the meantime, the threshold voltage between the ON and OFF states of the transistor Tr1 is ($V_{cc}-2.01$) V. Since ($V_{cc}-0.7+C_v$)>($V_{cc}-2.1$) V, the transistors Tr1 and Tr2 are turned OFF whereas the transistor Tr3 is turned ON thereby to actuate the relay Ry. The normally open contact rya of the relay Ry is thereby turned ON, so that electric power is supplied to the cleaning device motor 7.

When the electric potential V at the connecting point P1 has thus risen up sharply, the electric charge accumulated in the capacitor C starts discharge from the positive side of the capacitor C through the resistor R6, the negative side of the electric power source 8, the positive side of the power source 8, normally open contact rya, diode D3 and resistor 5, and finally to the negative side of the capacitor C. This discharge of the electric power causes the charged electric potential of the capacitor C, i.e., the potential voltage $V_{P1}$ at the connecting point P1 to keep declining. At the point in time when the charged electric potential of the capacitor C has reached ($V_{cc}-2.1$) V, which is the threshold voltage of the transistor Tr1, the transistors Tr1 and Tr2 are turned out to be ON state while the transistor Tr3 is turned OFF. As a result, the normally open contact rya of the relay Ry is turned OFF, thereby cutting off the supply of electric power to the cleaning device motor 7.

That is to say, in the headlamp cleaning device according to the second embodiment, when the cleaning device switch 9 is turned ON, the cleaning device motor 7 will be driven for the time period T by which the electric potential $V_{P1}$ at the connecting point P1 decreases to below the threshold voltage of the transistor Tr1 as the electric charge accumulated in the capacitor C is discharged.

Figure 3:
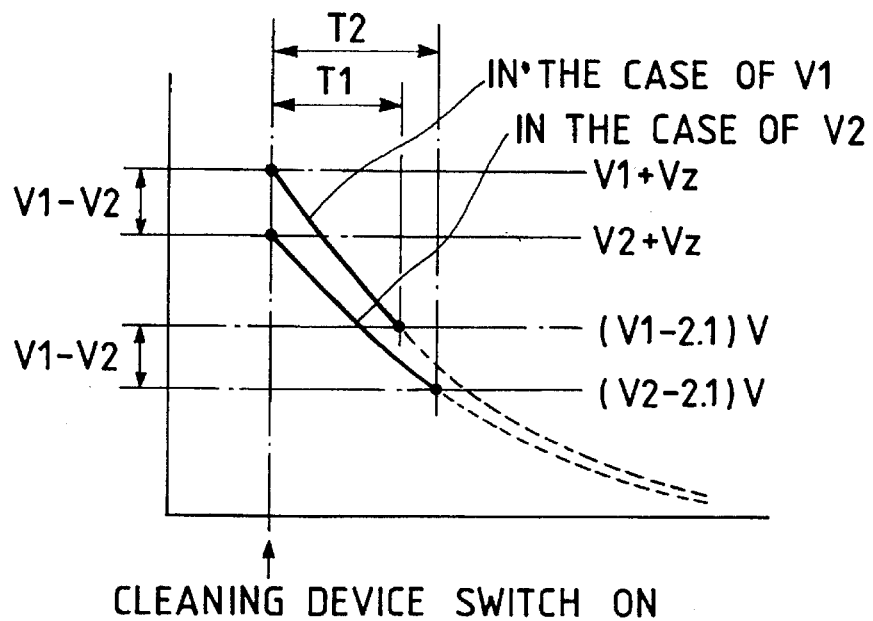
FIG. 3 is a chart illustrating the fluctuation characteristics of the electric potential VP1 in a case where the resistor R7 is set at 0 $\Omega$.

Here, assuming that the resistance R7 is set at 0 Ω, the charged voltage of the capacitor C becomes a certain constant value ($V_z+0.7$) V, which is not dependent on $V_{cc}$. $V_{P1}$ is expressed by ($V_{cc}-0.7$)+$C_v$, which is equal to ($V_{cc}-0.7$)+$V_z+0.7$, that is, $V_{cc}+V_z$. Thus, when comparing the values of T between a case in which $V_{cc}$ is $V_1$ and a case in which $V_{cc}$ is V2 (V1>V2), it is found that T (T1) in the case in which the $V_{cc}$ is V1 and T (T2) in the case in which the $V_{cc}$ is V2 is in the relation, T1<T2, as shown in the variation characteristics of the voltage $V_{P1}$ as shown in FIG. 3. That is, the operating time (T1) for the cleaning device motor when the electric power source voltage is at a higher level (V1) will be shorter than the operating time (T2) of the same motor in the case in which the electric source voltage is at a lower level (V2). In this case, the value of T2–T1 is approximately proportional to V2 –V1.

Figure 4:
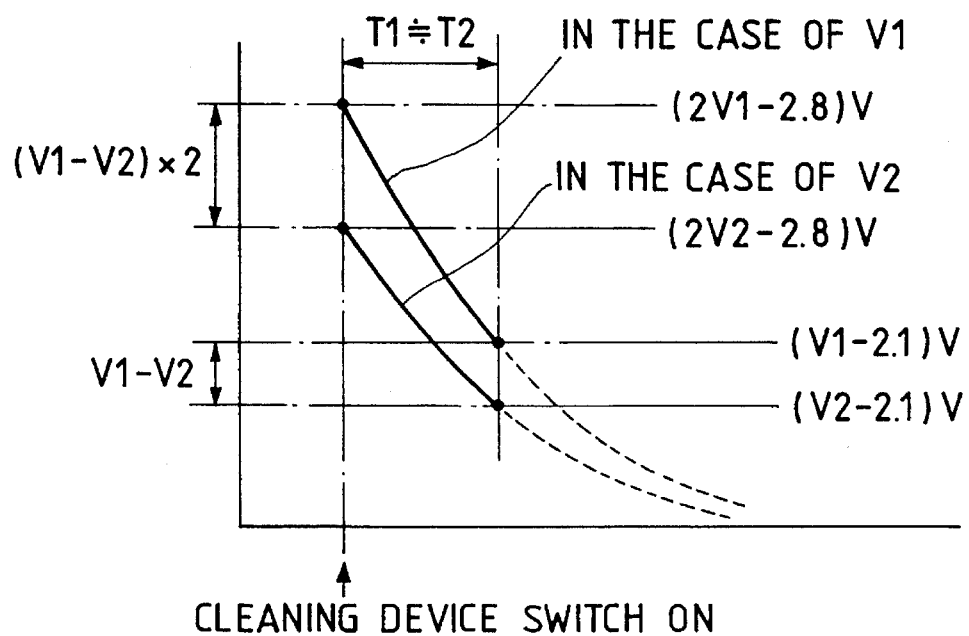
FIG. 4 is a chart illustrating the fluctuation characteristics of the electric potential VP1 in a case where the resistor R7 is set at $\infty$.

Now, when comparing the T values between the case in which Vcc is V1 and the case in which $V_{cc}$ is V2 with the resistance R7 set at ∞, it is found that $V_{P1}$ at the point in time when the cleaning device switch 9 is turned ON is VP1= $V_{cc}$–0.7+$C_v$, which is equal to $V_{cc}$–0.7+($V_{cc}$–2.1 V), that is, $2V_{cc}$–2.8 V. The threshold voltage itself of the transistor Trl being equal at R7=0 Ω, and, as shown in the variation characteristics of the electric potential of $V_{P1}$ at such a time as illustrated in FIG. 4, T1 is approximately equal to T2. In other words, the difference in electric potential at the point P1 between the case in which $V_{cc}$ is V1 and the case in which $V_{cc}$ is V2 is so large as (V1–V2)×2 at the point where the capacitor C starts discharging its voltage that there eventually remains almost no difference between T1 and T2.

Figure 5:
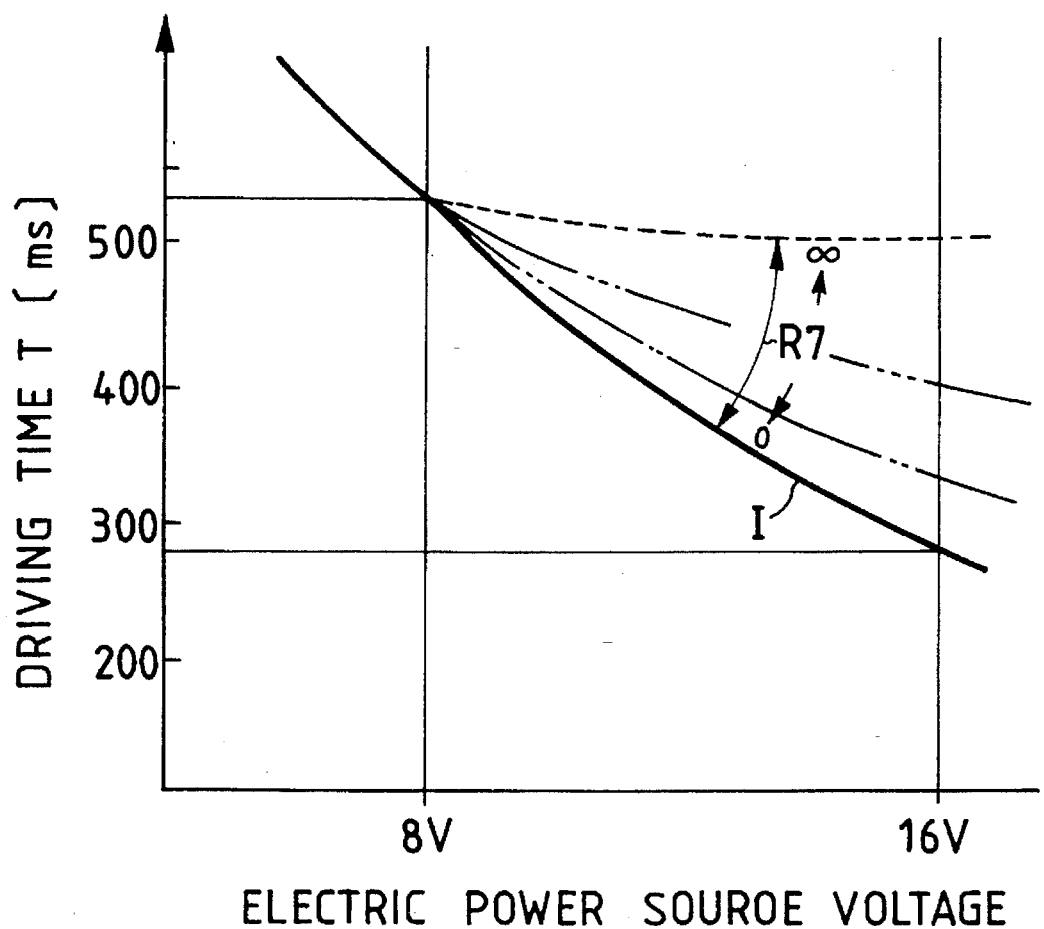
FIG. 5 is a chart illustrating the relation between the time T for driving the motor and the value of the voltage in the electric power source.

FIG. 5 shows the relationship between the driving time T for the cleaning device motor 7 and the voltage value of the electric power source 8. The characteristics I, which are drawn by a solid line in FIG. 5, are the characteristics which are attained in a case where the value of the resistor R7 is set at 0 Ω. As the value of the resistance R7 grows larger, the characteristic curve becomes calm in its gradient. This characteristic curve varies with the Zener voltage of the Zener diode ZD.

According to the second embodiment of the present invention, it is possible to always attain a constant cleaning capability by keeping the ejected quantity of the cleaning fluid constant for a single cleaning operation by setting the value of the resistor R7 or the Zener voltage of the Zener diode ZD at an appropriate level without any regard to the value of the voltage in the electric power source 8.

As is evident from the description made hereinabove, the present invention provides a headlamp cleaning device which is always capable of achieving a constant cleaning capability, keeping the ejected quantity of the cleaning fluid constant for a single cleaning operation, without any regard to the variation in the voltage in the power source. This is accomplished by appropriately setting the relation between the time period for driving the motor and the value of the electric power source voltage whereby the driving time for the motor for every cleaning operation is extended as the voltage in the electric power source declines, and the driving time for the motor for any single cleaning operation is shortened as the voltage in the electric power source rises to a higher level.

What is claimed is:

1. A headlamp cleaning device which ejects cleaning water stored in a tank onto a headlamp through a nozzle by driving a motor for a predetermined time period in response to a switch operation, comprising:

an electric power source voltage monitoring means, which monitors the electric power source voltage supplied to the motor; and a motor driving time circuit, which sets a longer driving time for the motor as the value of the monitored electric power source voltage decreases, but sets a shorter driving time for the motor as the value of the monitored electric power source voltage increases.

2. A headlamp cleaning device as recited in claim 1, further comprising:

a relay for controlling the electric power source voltage supplied to the motor.

3. A headlamp cleaning device as recited in claim 2, wherein the relay is controlled by the motor driving time circuit.

4. A headlamp cleaning device as recited in claim 3, wherein the motor driving time circuit is energized by momentarily closing a switch.

5. A headlamp cleaning device as recited in either one of claims 1 and 4, wherein the motor driving time circuit includes a capacitor.

6. A headlamp cleaning device as recited in claim 5, further comprising:

a voltage control circuit for controlling the voltage across the capacitor.

7. A headlamp cleaning device as recited in claim 6, wherein the voltage control circuit is connected in parallel with the capacitor and comprises:

a Zener diode; and a resistor connected in series with the Zener diode;

wherein the motor drive time is controlled by setting one of the value of the resistor or of the voltage of the Zener diode.

\* \* \* \* \*